United States Patent

[11] 3,616,263

| [72] | Inventor | Ernest J. Anandam |
| | | Knoxville, Tenn. |
| [21] | Appl. No. | 833,491 |
| [22] | Filed | June 16, 1969 |
| [45] | Patented | Oct. 26, 1971 |
| [73] | Assignee | The University of Tennessee Research Corporation |
| | | Knoxville, Tenn. |

[54] GAS CAP FOR CULTURE TUBES
9 Claims, 8 Drawing Figs.

| [52] | U.S. Cl. | 195/127, 195/139 |
| [51] | Int. Cl. | C12b 1/00 |
| [50] | Field of Search | 195/127, 139 |

[56] References Cited
UNITED STATES PATENTS

| 3,451,894 | 6/1969 | Anandam | 195/139 |

*Primary Examiner*—Alvin E. Tanenholtz
*Attorney*—Cameron, Kerkam & Sutton

ABSTRACT: A cap for culture tubes for tubercle bacilli and other capnophilic micro-organisms and a modification thereof for anaerobic micro-organisms comprising a cylindrical screw cap within which is disposed a cup structure receiving a cylindrical, rupturable capsule containing $CO_2$ or compounds that create an anaerobic condition.

PATENTED OCT 26 1971 3,616,263

INVENTOR.
ERNEST J. ANANDAM
BY
Cameron Kerkam & Sutton
ATTORNEYS

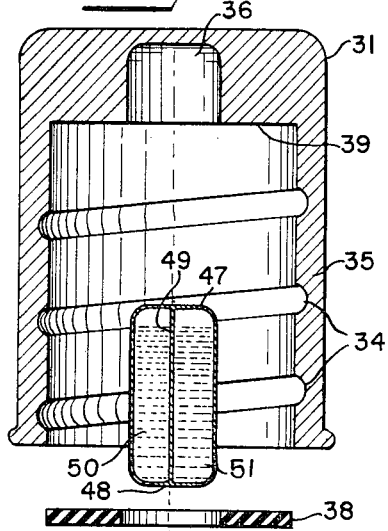
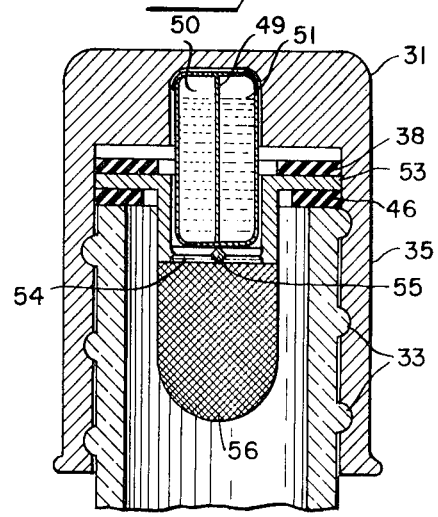
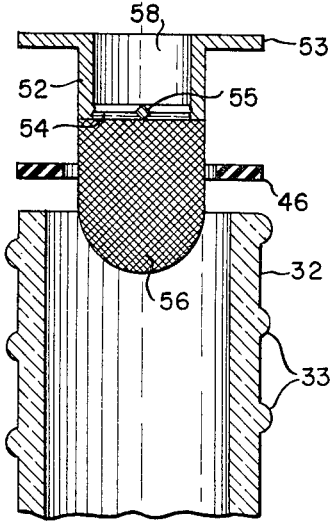
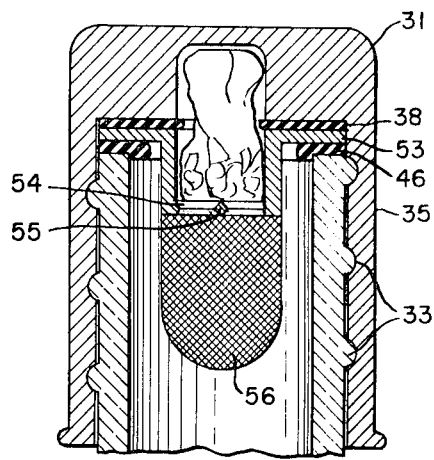
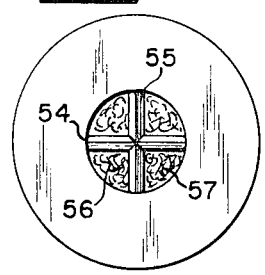

GAS CAP FOR CULTURE TUBES

This application concerns improvements on the invention disclosed in my application Ser. No. 634,770, filed Apr. 28, 1967 now U.S. Pat. No. 3,451,894 for GAS CAP FOR CULTURE TUBES.

BACKGROUND OF THE INVENTION

This invention relates to an improved culture tube for the cultivation of *tubercle bacilli* and other capnophilic micro-organisms or for the cultivation of anaerobic micro-organisms in which a rupturable capsule of $CO_2$ gas or a capsule of anaerobic compounds are provided within the screw-threaded cap for the culture tube over an internal cup therein. When the cap is screwed down on the screw-threaded upper extremity of the culture tube the capsule will be ruptured and $CO_2$ released into the culture tube or an anaerobic condition created in the culture tube to promote growth of micro-organisms therein.

The amount of $CO_2$ present in the rupturable capsule in the cap should be sufficient to produce a concentration of from 2 to 5 percent $CO_2$ in the atmosphere in the tube, which is stimulatory and even essential for the growth of mycobacteria on the 7H10 agar medium.

It is well accepted that carbon dioxide influences the physiological process of micro-organisms in several ways. It is regarded as an essential constituent of the environment for a variety of micro-organism species. It has been reported that incubating bacteria under increased $CO_2$ tension (1 to 5 percent) abolishes the requirement of biotin for certain strains of Mycobacterium tuberculosis which require biotin.

Various methods have been used in the past to maintain an atmosphere of increased $CO_2$ in culture vessels. The most popular method of incubating the cultures with loose lids in $CO_2$ incubators had the disadvantage that the culture medium dried up due to the prolonged incubation necessary for the growth of mycobacteria. To overcome this problem, the cultures were placed in $CO_2$ permeable plastic bags, not permeable to water vapor, then incubated in $CO_2$ incubators. Many laboratories producing cultures for mycobacteria lacked the expensive $CO_2$ incubators, therefore a simpler method was devised using 7×14 inch Mylar bags, which are impermeable to $CO_2$, to hold the cultures, along with a growing culture of Mycobacterium phlei, a saprophytic mycobacteria, on a separate petridish and sealing the bag. The growing *M. phlei* culture was found to produce an adequate amount of $CO_2$ to produce increased $CO_2$ tension inside the bag, in the course of time.

This method is presently becoming popular in many laboratories, especially since Kubica and associates' development of an improved method of sputum digestion with normal acetyl L-cysteine for the isolation of *tubercle bacilli* from clinical specimens.

While this method is an excellent one to eliminate the problems mentioned above, it involves the additional work of maintaining the culture of *M. phlei* and streaking the right amount of inoculum on a limited quantity of agar medium. Further, it requires more than eight days to attain the minimum required concentration of $CO_2$ and there is also the possibility of depletion of oxygen content when incubation is prolonged while *M. phlei* is still growing.

In the anaerobic embodiment, the capsule is preferably divided by a vertical septum to contain equal amounts of two compounds forming an anaerobic compound, for example 10 percent aqueous potassium hydroxide and 40 percent aqueous pyrogallic acid, which form an alkaline pyrogallic acid, when combined.

The present invention was developed to eliminate the many problems enumerated above and those encountered in anaerobiotis and to obtain better results with much less expensive equipment.

A prior patent of interest is Mackin, U.S. Pat. No. 3,248,302, which discloses the insertion within a petridish of a capsule containing a reducing agent or agents, or other chemicals for producing the desired atmospheric conditions within the sealed dish. The capsule is so positioned at one of the corners of the dish that when the lid is applied to the dish and forced downwardly, the capsule is ruptured, releasing its contents to the sealed interior of the dish to produce the required atmospheric conditions.

Other patents of interest in the field are numbers 2,285,651; 3,013,950; 3,055,808; 3,064,853 and 3,246,959, which relate to culture development, but do not disclose the inventive concept of the present invention.

SUMMARY OF THE INVENTION

The invention comprises, in brief, an improved culture tube, in the screw-threaded cap of which is placed a rupturable capsule containing $CO_2$ gas or an anaerobic compound under which are provided an open cup and a sealing washer, whereby when the cap is screwed down upon the screw-threaded neck of the culture tube the capsule is ruptured, releasing its $CO_2$ into the culture tube or creating an anaerobic condition inside the culture tube to promote growth of the culture therein.

It is therefore an object of this invention to provide an improved cap and capsule structure for a culture tube which is inexpensive and highly efficient and which eliminates the necessity for ancillary, expensive laboratory equipment.

It is a further object of this invention to produce a culture tube which is more efficient and in which the culture grows more readily than in conventional tubes.

It is another object of this invention to provide improved means for computing the amount of $CO_2$ or anaerobic compound to be contained in the capsule for a given culture tube.

Other and further objects of this invention will become apparent as this specification proceeds.

BRIEF DESCRIPTION OF THE DRAWINGS

FIG. 5 is a fragmentary exploded view, in vertical section and partially broken away, of the anaerobic embodiment of the invention with the elements in position for assembly;

FIG. 6 is a vertical sectional view of the embodiment shown in FIG. 5 in assembled position on the neck of the culture tube;

FIG. 7 is a vertical sectional view of this embodiment, with the cap screwed down on the neck of the culture tube and the capsule ruptured and FIG. 8 is a top elevational view of the cup structure of this embodiment.

DESCRIPTION OF THE PREFERRED EMBODIMENTS

In the embodiment of the invention shown in FIGS. 1, 2, 3, and 4, a cylindrical glass or plastic capsule is provided, containing a predetermined volume of $CO_2$ gas, or other compound designed to be emitted into the culture tube upon breaking or rupturing of the capsule, as will hereinafter be described in more detail.

The primary object of this embodiment of the invention is to reduce technical problems in the manufacture of the capsule under sterile conditions and to provide improved means for computing the amount of $CO_2$ or other compounds to be contained in the capsule for a given culture tube.

Figure 1:
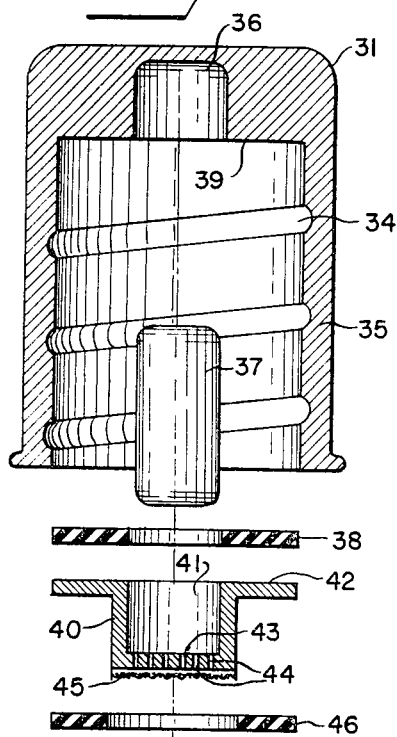
FIG. 1 is a fragmentary exploded view, in vertical section and partially broken away, of one embodiment of the invention.

Referring to FIG. 1, a modified form of the cap 31 is shown, preferably formed of Bakelite, or analogous material, of an internal diameter substantially equal to the external diameter of the neck 32 of the culture tube which is, as aforesaid, provided with outwardly extending threads 33 which register in appropriate mating grooves 34 provided about the interior surface of collar 35 of cap 31, whereby cap 31 may be screwthreadedly engaged on neck 32 of the culture tube.

Provided within the upper surface of cap 31 and centrally located therein is a cylindrical recess 36 designed to receive the upper extremity of capsule 37, which is of the same axial dimensions as recess 36, so as to fit closely therein.

Preferably, capsule 37 is formed of thin glass or plastic or analogous material and its dimensions, when used with a Lowenstein-Jensen medium tube No. 03-273TS, of the Baltimore Biological Laboratories, is $r=0.4$ cm. and $h=2$ cm. The aforesaid Lowenstein-Jensen tube has an atmospheric content of 25 cc. and with the aforesaid dimensions, the capsule will contain slightly more than 1 cc. of $CO_2$, or other chemical compound, which when discharged into the culture tube and sealed will result in the desired atmospheric condition within the culture tube.

Obviously, for larger culture tubes the dimensions of the cylindrical capsule may be appropriately varied to control the $CO_2$ tension or atmospheric condition within the tube.

A rubber washer 38 is preferably provided, closely fitting under shoulder 39 at the upper, inner extremity of cap 31 of the same outside diameter as the inner diameter of cap 31 beneath shoulder 39.

Figure 2:
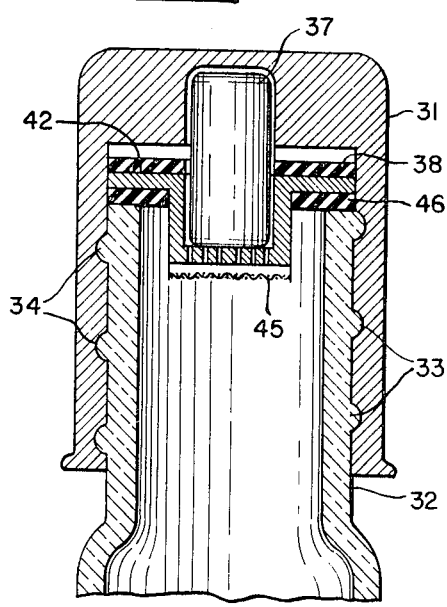
FIG. 2 is an assembled view of the embodiment shown in FIG. 1.
Figure 2:
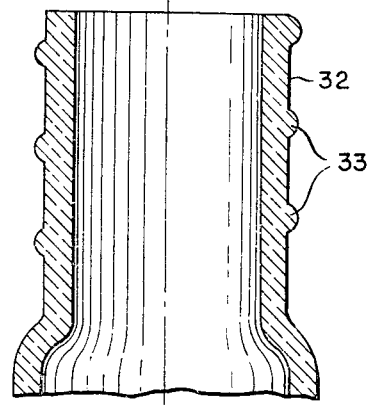
Figure 3:
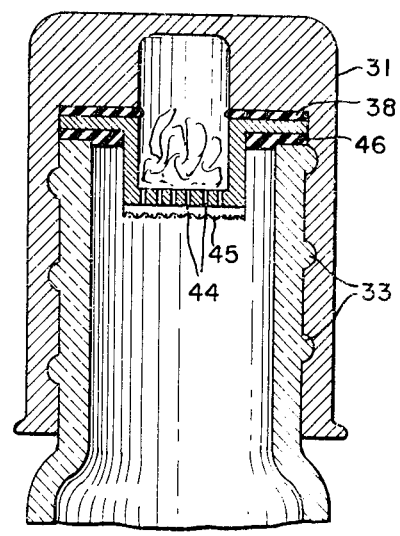
FIG. 3 is an assembled view of this embodiment, with the cap screwed downwardly on the neck of the culture tube and the capsule ruptured.

A metal cup 40 is provided, fitting within cap 31 under washer 38, as shown in FIGS. 2 and 3, and is preferably provided with a central cylindrical recess 41, so dimensioned as to closely receive the lower extremity of capsule 37 when the cap, capsule and cup elements are assembled.

At its upper extremity, cup 40 is provided with a rectangularly disposed, circular flange 42 of the same diameter as the inner diameter of cap 31, below shoulder 39, and of the same dimensions as washer 38, whereby flange 42 of cup 40 will fit closely within cap 31, bearing upwardly against washer 38 and shoulder 39 of cap 31.

Figure 4:
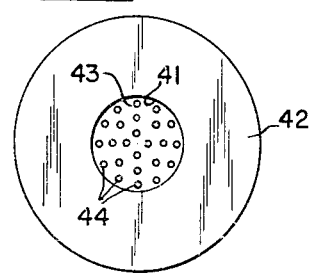
FIG. 4 is a top elevational view of the modified cup structure for this embodiment.

At its lower surface 43, cup 40 is provided with a series of perforations 44, as shown in FIG. 4, for a purpose hereinafter to be more fully discussed.

Affixed over the lower surface 43 of cup 40, beneath perforations 44 is a fine mesh screen or cloth 45, designed to prevent ingress of fragments of capsule 37, when ruptured, into the culture tube, as will hereinafter be further discussed.

Disposed over the top of the neck 32 of the culture tube is a second rubber washer 46 so dimensioned as to fit closely about the outer, upper periphery of cup 40, fitting closely under circular collar 42 thereof, to provide a tight seal between the lower surface of collar 42 and the upper edge of neck 32 of the culture tube when cap 31 is screwed downwardly thereover.

The view shown in FIG. 1 is an exploded, vertical sectional view of the cap 31, capsule 37, washer 38, cup 40 and washer 46 prior to assembling the structure over the culture tube neck 32, as shown in FIGS. 2 and 3.

The cap, capsule and cup structure is preferably preassembled as a unit by first placing the washer 38 within cap 31 against shoulder 39 thereof, the upper portion of capsule 37 then being inserted into recess 36 of cap 31. Cup 40 is then inserted within cap 31, its recess 41 receiving the lower portion of capsule 37, and washer 46 is then applied about cup 40, fitting closely under shoulder 42 thereof. The entire cap, capsule and cup assembly is sterile packed. Prior to use, the assembly is removed from the sterile pack and placed aseptically within and over the neck 32 of the culture tube, prior to screwing cap 31 downwardly over neck 32, closely engaging capsule 37 between the upper surface of recess 36 and the lower surface 43 of cup 40, as shown in FIG. 2.

With the structure so assembled, further clockwise turning of cap 31 will compress glass or plastic capsule 37 between cap 31 and lower surface 43 of cup 40, rupturing capsule 37, as shown in FIG. 3, and releasing its $CO_2$ gas or other content into the interior of the culture tube through orifices 44 in the lower surface 43 of cup 40. As aforesaid, fine screen 45 is provided beneath orifices 44 of cup 40 to prevent the ingress of fragments of the capsule into the culture tube.

A modification of the invention is shown in FIGS. 5, 6, 7 and 8, designed to produce an anaerobic condition in the tube.

FIG. 5 is a partial, vertical sectional view of a modified cap, capsule and cup structure quite analogous to that shown in FIGS. 1, 2, 3 and 4, with certain modifications, as will hereinafter be more fully discussed.

In this embodiment, the general assembly of the cap, capsule and cup structure is similar to that previously discussed in connection with FIGS. 1–4, inclusive, with certain salient differences as will be discussed.

In this embodiment, the basic cap, washer and cup structures are substantially identical to those previously discussed, and where identical, like reference numerals will be used.

The primary difference between these two embodiments lies in the capsule structure per se and in the configuration of the bottom of the cup structure and the screen structure disposed therebeneath.

Thus, in the embodiment shown in FIG. 5, the capsule 47 is preferably formed of glass or analogous inert material, which is hard and brittle, and is of the same dimensions, i.e., 0.4 cm.×2 cm. and of a volume of a little over 1 cc.

Capsule 47 is preferably of reduced thickness at its lower extremity 48, as shown in FIG. 5, and is preferably divided vertically by a septum 49 into two equal chambers 50 and 51 which contain equal amounts, i.e., 0.5 cc., of two reagents designed to combine to form an alkaline pyrogallic acid which will rapidly absorb the oxygen in its environment. For manufacturing convenience, capsule 47 may be formed as two separate, identical, hemicylindrical chambers, each containing one of the two reagents.

I have determined that the reagents 10 percent aqueous potassium hydroxide and 40 percent aqueous pyrogallic acid when mixed in quantities of about 0.5 ml. each, under sealed conditions, in a standard bacterial culture tube containing about 25 cc. of atmospheric air, will provide a satisfactory anaerobic condition to support the growth of the strict anaerobes.

Thus, if the capsule 47 is formed of a radius of 0.4 cm. and a height of 2 cm. each compartment as defined by septum 49 thereof will hold 0.5 cc. of the two reagents, i.e., 10 percent aqueous potassium hydroxide and 40 percent aqueous pyrogallic acid. These reagents are stable in sealed condition.

Referring now to the cup structure 52, it is identical at its upper portions to the cup described in FIG. 1 and is provided at its upper extremity with circular flange 53 fitting closely under washer 38 and shoulder 39 in the upper extremity of cap 31.

The bottom surface of cup 52, however, is not perforated as is cup 40, but is preferably provided with a cruciform bottom, as shown in FIG. 8, in which two V-shaped bars 54 and 55 are rectangularly disposed across the open bottom portion of the cup 52 to support the lower extremity of the capsule 47 therein.

Disposed beneath the cruciform bottom of cup 52 is an elongate web or mesh sack 56, which is preferably filled with absorbent cotton 57, for a purpose hereinafter more fully to be discussed.

As shown, in FIGS. 6 and 7, the elongate gauze or mesh sack 56 extends downwardly an appreciable distance within neck 32 of the culture tube when the entire cap, capsule, washer and cup structure is assembled, as shown in FIG. 6.

The manner of assembly of this embodiment of the invention is identical to that described in connection with the embodiment shown in FIGS. 1–4, inclusive. Here again, the cap, capsule, cup and washer combination is previously assembled and sterile packed. Prior to use, the sterile pack is removed and cup 52 is inserted into neck 32 of the culture tube, over washer 46. The cap 31 is then screwed downwardly over neck 32 of the culture tube until fully seated thereon, as shown in FIG. 6, with capsule 47 held firmly therein between cap recess 36 and the cruciform bottom of cup 52.

With the cap thus seated over the capsule and cup assembly, further turning down of the cap, as shown in FIG. 7, will result in the rupture of the lower, weakened portion of the capsule 47, thus releasing equal amounts of the two reagents, i.e., 10 percent aqueous potassium hydroxide and 40 percent aqueous pyrogallic acid into the cotton contained in the gauze bag 56 beneath cup 52 wherein the alkaline pyrogallic acid is formed to absorb the free oxygen from the interior of the culture tube.

The provision of the absorbent cotton 57 within the gauze bag 56 provides an absorbent for the aqueous chemical compound pyrogallic acid and prevents ingress thereof into the culture tube.

The embodiments previously described have been designed for use with the aforesaid Lowenstein-Jensen medium tube No. 03-273TS, with an inside atmospheric content of 25 cc. If a larger or smaller culture tube were used the dimensions of the cap and capsule should be appropriately modified to provide the desired increase of $CO_2$ tension within the culture tube.

In utilizing the cap and capsule structure the tube is fully sealed at all times, which prevents the drying up of the culture medium and acts to maintain the required $CO_2$/air ratio in the tube.

The gas cap eliminates the need for large and expensive $CO_2$ incubators or complicated gas chambers for the culture of micro-organisms.

The invention further eliminates the necessity for the use of bacterial cultures as the source of $CO_2$ and also eliminates the possibility of oxygen depletion. Using the cap and capsule structure of this invention, an environment with the desired concentration of $CO_2$, i.e., from 1-5 percent, is created simply and is maintained from the time the tube is sealed.

Obviously, the cap and capsule can be made in any dimensions and capacity required, depending upon the size of the culture tube involved and the percentage of $CO_2$, required therein. Normally, the capsule will contain less than 2 ml. of $CO_2$ gas, but this amount can be increased depending upon the atmospheric volume in the culture tube. The individual caps should be sterile and hermetically sealed, prior to use, to insure aseptic conditions. If it is necessary to open the culture tube, replacement of the cap will reconstitute the proper percentage $CO_2$ atmosphere in the tube.

The subject gas cap is primarily designed to eliminate many of the problems normally encountered in the cultivation of mycobacteria, but it can also be used successfully in the cultivation of certain pathogenic micro-organisms from clinical specimens which will not grow in the absence of increased $CO_2$ tension.

Culture tubes as disclosed herein are particularly well adapted for use in the field and where $CO_2$ incubators or gas chambers are not available. They have the added advantage that the micro-organisms are cultured with high efficiency and under uniform conditions.

The invention is susceptible of numerous modifications without departing from the spirit thereof.

Attention is directed to the appended claims for a limitation of the scope of this invention.

I claim:

1. In a gas cap and culture tube combination, a culture tube provided with a threaded neck, a cylindrical, internally screw-threaded cap fitting over said neck, a cylindrical metal cup provided with a peripheral flange equal to the internal diameter of said cap, said cup positioned upright and fitted over the neck of said culture tube and within said cap and provided with a perforated lower surface, a cylindrical, rupturable capsule filled with a culture growth-promoting compound positioned within and extending outside said cup, a washer provided over the upper surface of said flange and being of equal diameter therewith, a sealing ring provided under the lower surface of said flange and over the top surface of the neck of the culture tube, the space between the inside of the cup with the washer in place and the inner top portion of the cap is smaller than the size of the capsule whereby when a capsule is inserted within said cup and said cap is screwed downwardly over the neck of the culture tube the capsule will be ruptured, emitting its contents into the culture tube through the orifices in the lower surface of said cup.

2. A gas cap and culture tube combination in accordance with claim 1 in which the capsule is formed of thin glass.

3. A gas cap and culture tube combination in accordance with claim 1 in which the capsule is formed of plastic.

4. A gas cap and culture tube combination in accordance with claim 1 in which the capsule is on the order of $r=0.4$ cm. and $h=2$ cm.

5. A gas cap and culture tube combination in accordance with claim 1 in which the capsule is filled with $CO_2$ gas.

6. A gas cap and culture tube combination in accordance with claim 1 in which the capsule is divided by a vertical septum into two equal chambers containing equal amounts of two anaerobic reagents, which combine upon rupturing of the capsule.

7. A gas cap and culture tube combination in accordance with claim 6 in which the reagents are 10 percent aqueous potassium hydroxide and 40 percent aqueous pyrogallic acid, which combine to form an alkaline pyrogallic acid.

8. A gas cap and culture tube combination in accordance with claim 1 in which the bottom of said cup is provided with a fine mesh screen to prevent ingress of capsule fragments into the culture tube.

9. A gas cap and culture tube combination in accordance with claim 6 in which a mesh bag filled with cotton is provided beneath the lower surface of said cup.

* * * * *